US012626525B2

(12) United States Patent
Humbert et al.

(10) Patent No.: US 12,626,525 B2
(45) Date of Patent: May 12, 2026

(54) SYSTEM FOR RECOGNIZING ONLINE HANDWRITING

(71) Applicant: SOCIÉTÉ BIC, Clichy Cedex (FR)

(72) Inventors: Eric Humbert, Boulogne Billancourt (FR); Arthur Belhomme, Paris (FR); Amélie Caudron, Paris (FR)

(73) Assignee: SOCIÉTÉ BIC, Clichy Cedex (FR)

( * ) Notice: Subject to any disclaimer, the term of this patent is extended or adjusted under 35 U.S.C. 154(b) by 242 days.

(21) Appl. No.: 18/250,312

(22) PCT Filed: Oct. 22, 2021

(86) PCT No.: PCT/EP2021/079431
§ 371 (c)(1),
(2) Date: Apr. 24, 2023

(87) PCT Pub. No.: WO2022/090096
PCT Pub. Date: May 5, 2022

(65) Prior Publication Data
US 2023/0401878 A1 Dec. 14, 2023

(30) Foreign Application Priority Data
Oct. 26, 2020 (EP) .................................... 20306281

(51) Int. Cl.
*G06V 30/226* (2022.01)
*G06V 30/19* (2022.01)
(Continued)

(52) U.S. Cl.
CPC .... *G06V 30/2268* (2022.01); *G06V 30/19147* (2022.01); *G06V 30/1918* (2022.01);
(Continued)

(58) Field of Classification Search
CPC ......... G06V 30/2268; G06V 30/19147; G06V 30/1918; G06V 30/228; G06V 30/347; G06V 30/36
See application file for complete search history.

(56) References Cited

U.S. PATENT DOCUMENTS 10,126,825 B2 11/2018 Lefebvre
2016/0154485 A1* 6/2016 Kampt .................. G06F 3/0383
345/179

(Continued)

FOREIGN PATENT DOCUMENTS

CN 110134257 A * 8/2019 .......... G06F 3/0346
CN 115769177 A 3/2023
WO WO-03025829 A2 * 3/2003 ............. G06K 9/222

OTHER PUBLICATIONS

Hsu, Y-L. et al., "An Inertial Pen With Dynamic Time Warping Recognizer for Handwriting and Gesture Recognition," IEEE Sensors Journal, 15(1), 2015, p. 154-163. (Year: 2015).*
(Continued)

*Primary Examiner* — Emily C Terrell
*Assistant Examiner* — Daniella M. DiGuglielmo
(74) *Attorney, Agent, or Firm* — Bookoff McAndrews, PLLC

(57) ABSTRACT

This invention concerns a system for recognizing online handwriting comprising: a handwriting instrument including a body extending longitudinally between a first end and a second end, the first end having a writing tip which is able to write on a support, the handwriting instrument further including a module comprising at least one motion sensor configured to acquire motion data on the handwriting of a user when the user is writing a characters sequence with the handwriting instrument, a calculating unit communicating with the at least one motion sensor and configured to analyze the motion data by a machine learning model trained in a
(Continued)

multitask way such that it is capable of performing at least two tasks at the same time, the machine learning model being configured to deliver as an output the characters sequence which was written by the user with the handwriting instrument.

17 Claims, 6 Drawing Sheets

(51) Int. Cl.
　　G06V 30/228 (2022.01)
　　G06V 30/32 (2022.01)
(52) U.S. Cl.
　　CPC .......... G06V 30/228 (2022.01); G06V 30/347 (2022.01); G06V 30/36 (2022.01)

(56) References Cited

U.S. PATENT DOCUMENTS

| | | | |
|---|---|---|---|
| 2016/0259436 A1* | 9/2016 | Nicholson | .............. G06F 3/0346 |
| 2016/0378195 A1 | 12/2016 | Lefebvre | |
| 2018/0299976 A1* | 10/2018 | Chiewcharnpipat | ......................... G06F 3/0346 |
| 2020/0250413 A1* | 8/2020 | Lu | ........................ G06V 30/228 |

OTHER PUBLICATIONS

He, S. & Schomaker, L., "Deep Adaptive Learning for Writer Identification based on Single Handwritten Word Images," arXiv, 2018, p. 1-24. (Year: 2018).*
Xie, Z. et al., "Learning Spatial-semantic Context with Fully Convolutional Recurrent Network for Online Handwritten Chinese Text Recognition," arXiv, 2017, p. 1-14. (Year: 2017).*
Bashir, M. & Kempf, J., "Reduced Dynamic Time Warping for Handwriting Recognition Based on Multi-dimensional Time Series of a Novel Pen Device," International Scholarly and Scientific Research & Innovation, 2(9), 2008, p. 1839-1845. (Year: 2008).*
Agrawal, S. et al., "Using Mobile Phones to Write in Air," MobiSys, 2011, p. 1-14. (Year: 2011).*
Agrawal et al., "Using Mobile Phones to Write in Air," MobiSys, 2011, p. 1-14. (Year: 2011).
Bashir et al., "Reduced Dynamic Time Warping for Handwriting Recognition Based on Multi-dimensional Time Series of a Novel Pen Device," International Scholarly and Scientific Research & Innovation, 2(9), 2008, p. 1839-1845. (Year: 2008).
Crawshaw, Michael. "Multi-Task Learning with Deep Neural Networks: A Survey." ArXiv abs/2009.09796 (2020): n. pag.
Sheng He and Lambert Schomaker. 2019. "Deep adaptive learning for writer identification based on single handwritten word images." Pattern Recognition. 88, C (Apr. 2019), 64-74. https://doi.org/10.1016/j.patcog.2018.11.003.
Z. Chen, Y. Wu, F. Yin and C.-L. Liu, "Simultaneous Script Identification and Handwriting Recognition via Multi-Task Learning of Recurrent Neural Networks," 2017 14th IAPR International Conference on Document Analysis and Recognition (ICDAR), Kyoto, Japan, 2017, pp. 525-530, doi: 10.1109/ICDAR.2017.92.
Hsu Yu-Liang et al: "An Inertial Pen With Dynamic Time Warping Recognizer for Handwriting and Gesture Recognition" IEEE Sensors Journal, IEEE Service Center, New York, NY, US, vol. 15, No. 1, Jan. 1, 2015 (Jan. 1, 2015), pp. 154-163, XP011563608, ISSN: 1530-437X, DOI: 10.1109/JSEN.2014.2339843.
International Search Report issued in International Application No. PCT/EP2021/079431 on Feb. 14, 2022 (4 pages).
Tappert CC et al: "The State of the Art in On-Line Handwriting Recognition", IEEE Transactions on Pattern Analysis and Machine Intelligence, IEEE Computer Society, USA, vol. 12, No. 8, Aug. 1, 1990 (Aug. 1, 1990), pp. 787-808, XP000541894, ISSN: 0162-8828, DOI: 10.1109/34.57669.
Tasdemir Esma F et al: "A comparative study of delayed stroke handling approaches in online handwriting", International Journal on Document Analysis and Recognition, Springer, Heidelberg, DE, vol. 22, No. 1, Nov. 13, 2018 (Nov. 13, 2018), pp. 15-28, XP036722406, ISSN: 1433-2833, DOI: 10.1007/S10032-018-0313-2.
Wang Chengcheng et al: "Combined Segmentation and Recognition of Online Handwritten Diagrams with High Order Markov Random Field", 2014 14th International Conference on Frontiers in Handwriting Recognition, IEEE, Oct. 23, 2016 (Oct. 23, 2016), pp. 252-257, XP033041956, ISSN: 2167-6445, DOI: 10.1109/ICFHR.2016.0056.
Xie, Zecheng & Sun, Zenghui & Jin, Lianwen & Ni, Hao & Lyons, Terry. (2016). Learning Spatial-Semantic Context with Fully Convolutional Recurrent Network for Online Handwritten Chinese Text Recognition. IEEE Transactions on Pattern Analysis and Machine Intelligence. pp. 10.1109/TPAMI.2017.2732978.
Liu, B. et al. "Offline Handwritten Chinese Text Recognition with Convolutional Neural Networks." A PyTorch binding at https://github.com/baidu-research/warp-ctc. (2020).

* cited by examiner

SYSTEM FOR RECOGNIZING ONLINE HANDWRITING

CROSS-REFERENCE TO RELATED APPLICATIONS

This application is a National Stage Application under 35 U.S.C. § 371 of International Application No. PCT/EP2021/079431, filed Oct. 22, 2021, now published as WO 2022/090096 A1, which claims partial priority from European patent application No. 20306281.5, filed on Oct. 26, 2020, their content being incorporated herein by reference.

TECHNICAL FIELD

This disclosure pertains to the field of systems for recognizing online handwriting. More precisely, the disclosure pertains to the field of systems for online and continuous recognition of handwriting.

BACKGROUND ART

Currently, several systems or methods exist for recognizing the handwriting of a user. One type of handwriting recognition, called online handwriting recognition, consists of performing the recognition of a character, or a sequence of characters, while the user is writing it. Another type of handwriting recognition, called offline handwriting recognition, is based on the analysis of a picture showing text.

For example, it is known from patent document U.S. Ser. No. 10/126,825 to perform online handwriting recognition by using a device such as a mobile terminal and three sensors being an accelerometer, a gyroscope and a magnetometer. The method described in this document uses a neural network of BLSTM type (Bidirectional Long-short term memory). The data acquired by the three sensors are submitted to several pre-processes in order to be analyzed by the neural network. Moreover, the neural network is trained with a dictionary containing predetermined words. The neural network is trained such that it is able to recognize the beginning and the end of a word being written and, on this basis, the neural network is able to determine which word of the dictionary has been written. One drawback of this method is then the use of three sensors which leads to a device expensive to build. Another drawback of this document is that the neural network is trained to recognize predetermined words. The recognition is not made continuously.

It is also known from the scientific publication Learning Spatial-Semantic Context with Fully Convolutional Recurrent Network for Online Handwritten Chinese Text Recognition, Xie et al. published in August 2018 in IEEE Transactions on Pattern Analysis and Machine Intelligence, a method for detecting online handwriting. The method uses four neural networks: MC-FCRN (multi-spatial-context fully convolutional recurrent network), FCN (fully convolutional network), LSTM (long-short term memory) and CTC (connectionist temporal classification). The neural networks are jointly trained. The method uses the path signature method, applied on reduced windows of data. This publication does not describe how the data are effectively acquired, however using path signature method implies to use positional sensors like a camera or a touchscreen. Another drawback is the need of using four neural networks, each being trained in chain with the entry of the preceding neural network.

It is also known from the publication Offline Handwritten Chinese Text Recognition with Convolutional Neural Networks, Liu et al., published in 2020 in ArXiv, a method for offline handwriting recognition which cut line-of-text images into small time-steps before feeding them in a feature extractor neural network. However, this publication performs offline handwriting recognition, which is not adapted for the online handwriting recognition.

SUMMARY

One purpose of this disclosure is to improve the situation.

It is proposed a system for recognizing online handwriting comprising:

a handwriting instrument including a body extending longitudinally between a first end and a second end, the first end having a writing tip which is able to write on a support, the handwriting instrument further including a module comprising at least one motion sensor configured to acquire motion data on the handwriting of a user when the user is writing a characters sequence with the handwriting instrument, a calculating unit communicating with the at least one motion sensor and configured to analyze the acquired motion data by a machine learning model trained in a multitask way, the machine learning model being configured to deliver as an output the characters sequence which was written by the user with the handwriting instrument.

In embodiments, the module is embedded in the second end of the handwriting instrument.

In embodiments, the module is distinct from the handwriting instrument, i.e. it is a separate element. The module may be placed on an outside surface of the second end of the handwriting instrument.

In embodiments, the module further comprises the calculating unit.

In embodiments, the module further includes a short-range radio communication interface configured to communicate raw motion data acquired by the motion sensor to a mobile device comprising the calculating unit via a communication interface of the mobile device.

In embodiments, the motion sensor is a three-axis accelerometer.

In embodiments, the module further comprises a second motion sensor being a three-axis gyroscope.

In embodiments, the characters of the characters sequence comprise numbers and/or letters.

The herein disclosed systems may be used in a method for recognizing online handwriting, comprising:

acquiring, via a handwriting instrument comprising a module comprising at least one motion sensor, motion data on the handwriting of the user when the user is writing a sequence of characters with the handwriting instrument, the handwriting instrument further including a body extending longitudinally between a first end and a second end, the first end having a writing tip which is able to write on a support, analyzing the acquired motion data with a machine learning model trained in a multi-task way, the machine learning model being configured to deliver as an output the sequence of characters which was written by the user with the handwriting instrument.

In embodiments, the method further comprises a prior step of multi-task training of the machine learning model, wherein the machine learning model is trained to perform:

a stroke segmentation task, a character classification task.

In embodiments, the stroke segmentation task comprises labeling samples of the acquired motion data in at least one of the following classes:

on-paper stroke, in-air movement.

In embodiments, the acquired motion data are pre-processed before being used in the stroke segmentation task by:

windowing the raw motion data in time frames of N samples, each sample in the time frame being labeled in one of the on-paper stroke and/or in-air movement.

In embodiments, the in-air movement label comprises at least two sub labels:

forward in-air movement, backward in-air movement.

In embodiments, once trained, the machine learning model is stored, the method further comprising the analysis of the acquired motion data continuously and in real time with the trained machine learning model.

BRIEF DESCRIPTION OF DRAWINGS

Other features, details and advantages will be shown in the following detailed description and on the figures, on which.

DESCRIPTION OF EMBODIMENTS

FIGS. 1 to 6 illustrate embodiments of a system 1 for recognizing online handwriting. The same reference numbers are used to describe identical elements of the system 1.

Figure 1:
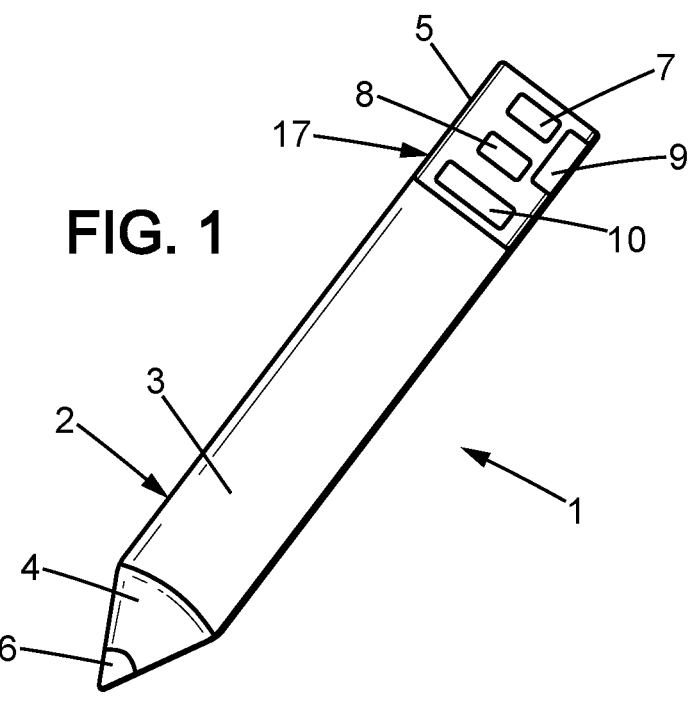
FIG. 1 shows an illustration of a system for detecting handwriting problems according to a first embodiment.
Figure 2:
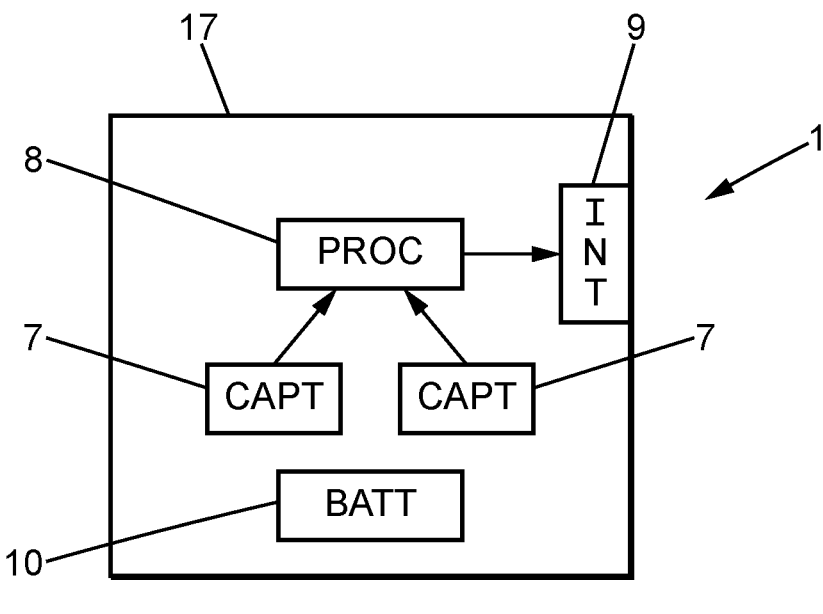
FIG. 2 shows a block schema of the system illustrated in FIG. 1.
Figure 3:
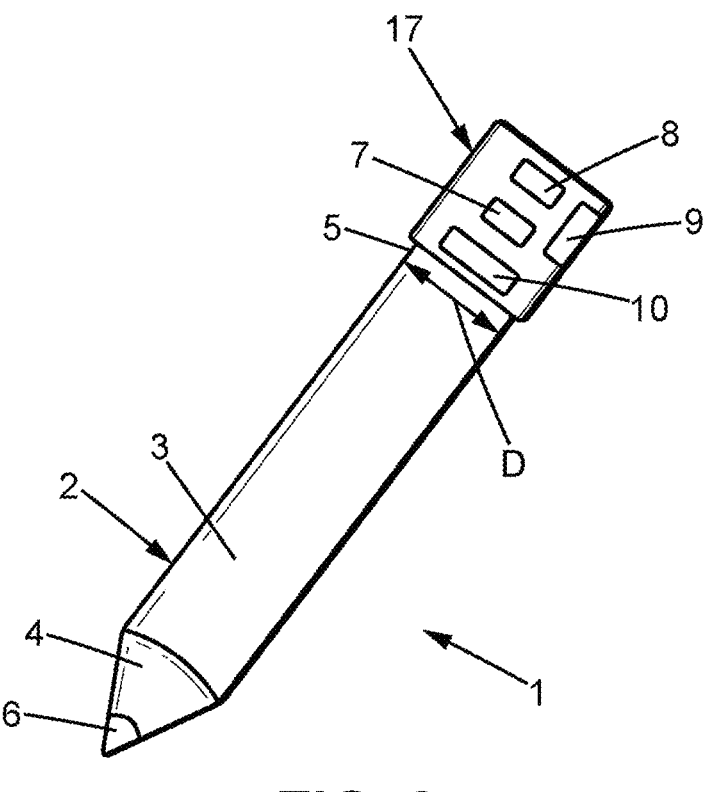
FIG. 3 shows an illustration of a system for detecting handwriting problems according to a second embodiment.
Figure 4:
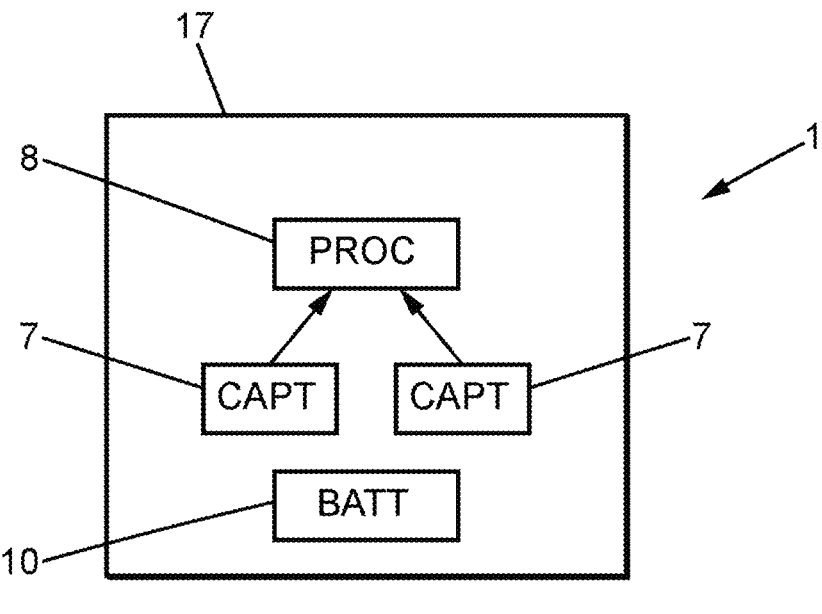
FIG. 4 shows a block schema of the system illustrated in FIG. 3.

FIGS. 1 and 2 generally illustrates a system 1 according to a first embodiment. The system 1 comprises a handwriting instrument 2. The handwriting instrument 2 may be a pen, a pencil, a brush or any element allowing a user to write with it on a support. The support may be paper, canvas, or any surface on which a user can write or draw. In embodiments, the support may be any non-electronic surface.

The handwriting instrument 2 comprises a body 3 extending longitudinally between a first end 4 and a second end 5. The first end 4 comprises a writing tip 6 which is able to write on a support. The tip 6 may deliver ink or color.

The system 1 may comprise a module 17. In embodiments, the module 17 comprises at least one motion sensor 7. In embodiments, the motion sensor 7 may be a three-axis accelerometer.

In embodiments, the module 17 may further comprise a second motion sensor 7. For example, the second motion sensor 7 is a three-axis gyroscope.

In embodiments, the module 17 is embedded in the handwriting instrument 2. For example, the module 17 is embedded near or at the second end 5 of the handwriting instrument.

In embodiments, the module 17 is distinct from the handwriting instrument 2. In the embodiment shown FIGS. 3 and 4, the module 17 is able to be placed on an outside surface of the second end 5 of the handwriting instrument.

Hence, the module 17 may comprise a hole of a diameter D allowing the insertion of the second end 5 of the handwriting instrument in it.

In embodiments, at least one motion sensor 7 is then placed or at the second end 5 of the handwriting instrument 2. In this way, the user of the handwriting instrument is not bothered when he uses the handwriting instrument 2, since module 17 does not block his sight.

For all the embodiments described hereinafter, the module 17 may be embedded in the handwriting instrument 2, or may be distinct/separate from the handwriting instrument 2.

In embodiments, at least one motion sensor 7 is able to acquire data on the handwriting of the user when the user is using the handwriting instrument 2. These data are communicated to a calculating unit 8 which is configured to analyze the data and perform the recognition of handwriting.

The calculating unit 8 may comprise a volatile memory to store the data acquired by the motion sensor 7 and a non-volatile memory to store a machine learning model enabling the handwriting recognition.

In the embodiment shown in FIGS. 1 to 4, the module 17 further comprises the calculating unit 8.

Figure 5:
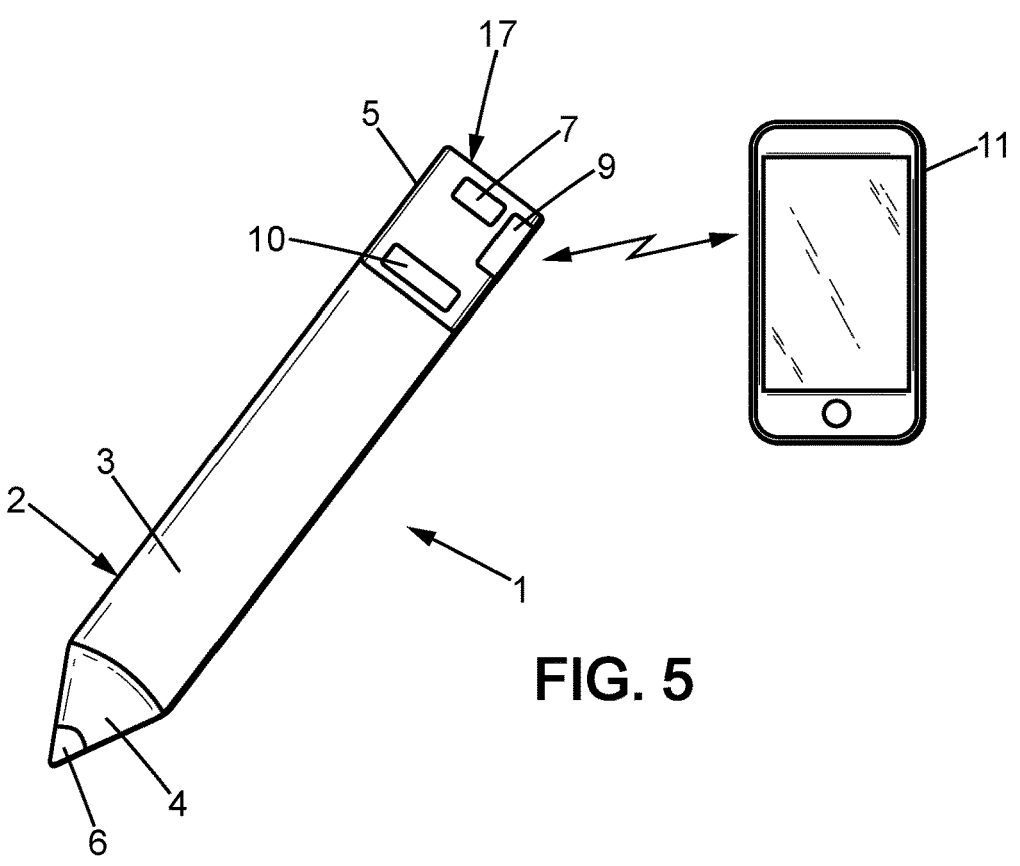
FIG. 5 shows an illustration of a system for detecting handwriting problems according to a third embodiment.
Figure 6:
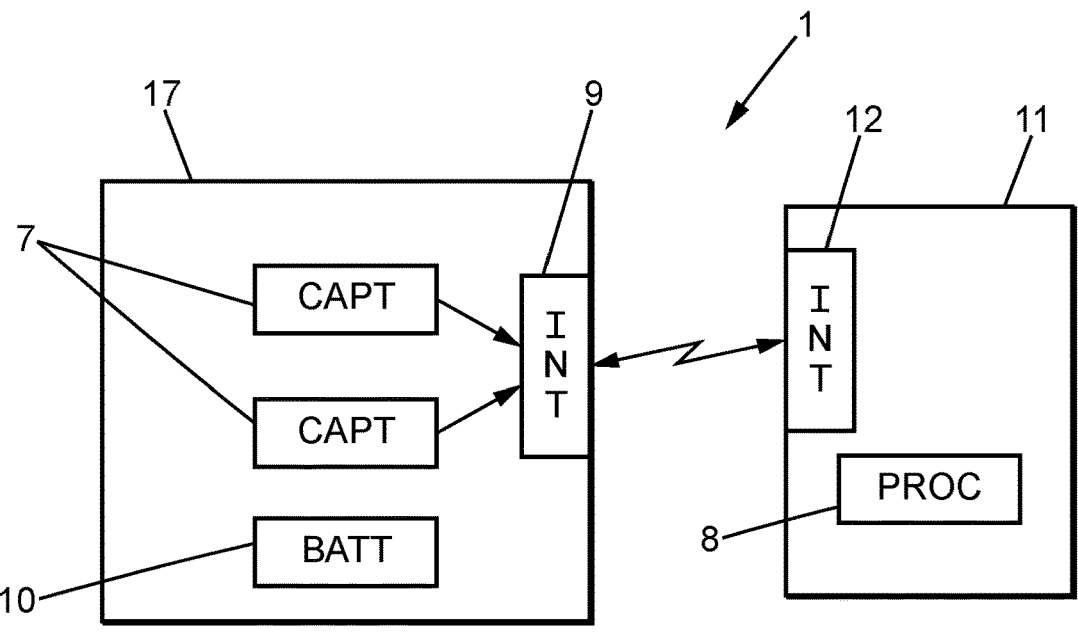
FIG. 6 shows a block schema of the system illustrated in FIG. 5.

In the embodiment shown in FIGS. 5 and 6, the module 17 does not comprise the calculating unit 8.

In this embodiment, the calculating unit 8 may be comprised in a mobile device. The mobile device 11 may typically be an electronic tablet, a mobile phone or a computer.

The module 17 may also comprise a short-range radio communication interface 9 allowing the communication of data between the at least one motion sensor 7 and the calculating unit 8. In embodiments, the short-range radio communication interface uses a Wi-Fi, Bluetooth®, LORA®, SigFox® or NBIoT network. In embodiments, it can also communicate using a 2G, 3G, 4G or 5G network.

The mobile device 11 further comprises a short-range radio communication interface 12 enabling communication between the calculating unit 8 and the module 17 via the short-range radio communication interface 9.

In embodiments, the calculating unit 8 may be comprised in the cloud. The calculating unit 8 may be accessible via the mobile device 11.

When the calculating unit 8 is comprised in the module 17, as shown on FIGS. 1 to 4, the module 17 may still comprise the short-range radio communication interface 9, in order to communicate results to a deported server (not shown), as a non-limitative example.

The module 17 may further include a battery 10 providing power to at least the motion sensor 7 when the user is using the handwriting instrument. The battery 10 may also provide power to all the other components that may be comprised in the module 17, such as the calculating unit 8, the short-range radio communication interface 9.

In all embodiments, the calculating unit 8 receives motion data acquired from at least on motion sensor 7 to analyze them and perform handwriting recognition.

In embodiments, the motion data received by the calculating unit 8 are raw motion data.

More specifically, the calculating unit 8 may store a machine learning model able to analyze the motion data acquired by the motion sensor 7. The machine learning model may comprise at least one neural network. The machine learning model is trained to perform the recognition of a sequence of characters which has been written by the user while using the handwriting instrument 2.

The machine learning model is trained in a multi-task way.

More specifically, the machine learning model may be trained to perform two tasks being the recognition of a character which has been written by the user while using the handwriting instrument 2, which is designated as the first task, and the segmentation of strokes, which is designated as the second task.

The first and second tasks share the same backbone being a neural network, which extracts the hidden features of the motion data. This neural network is, in a non-limitative embodiment, a convolutional neural network such as an encoder. This encoding neural network is designated hereinafter as the shared backbone.

The first task may be performed, in embodiments, by the neural network being the shared backbone, together with a recursive neural network, such as a BLSTM or a Transformer, trained with the CTC loss function.

The second task may be performed, in embodiments, by an auto-encoder neural network, whose encoder is the shared backbone and decoder is an additional convolutional neural network with upsampling.

The machine learning model is trained in a multi-task way such that it is capable of performing at least these two tasks at the same time.

Figure 7:
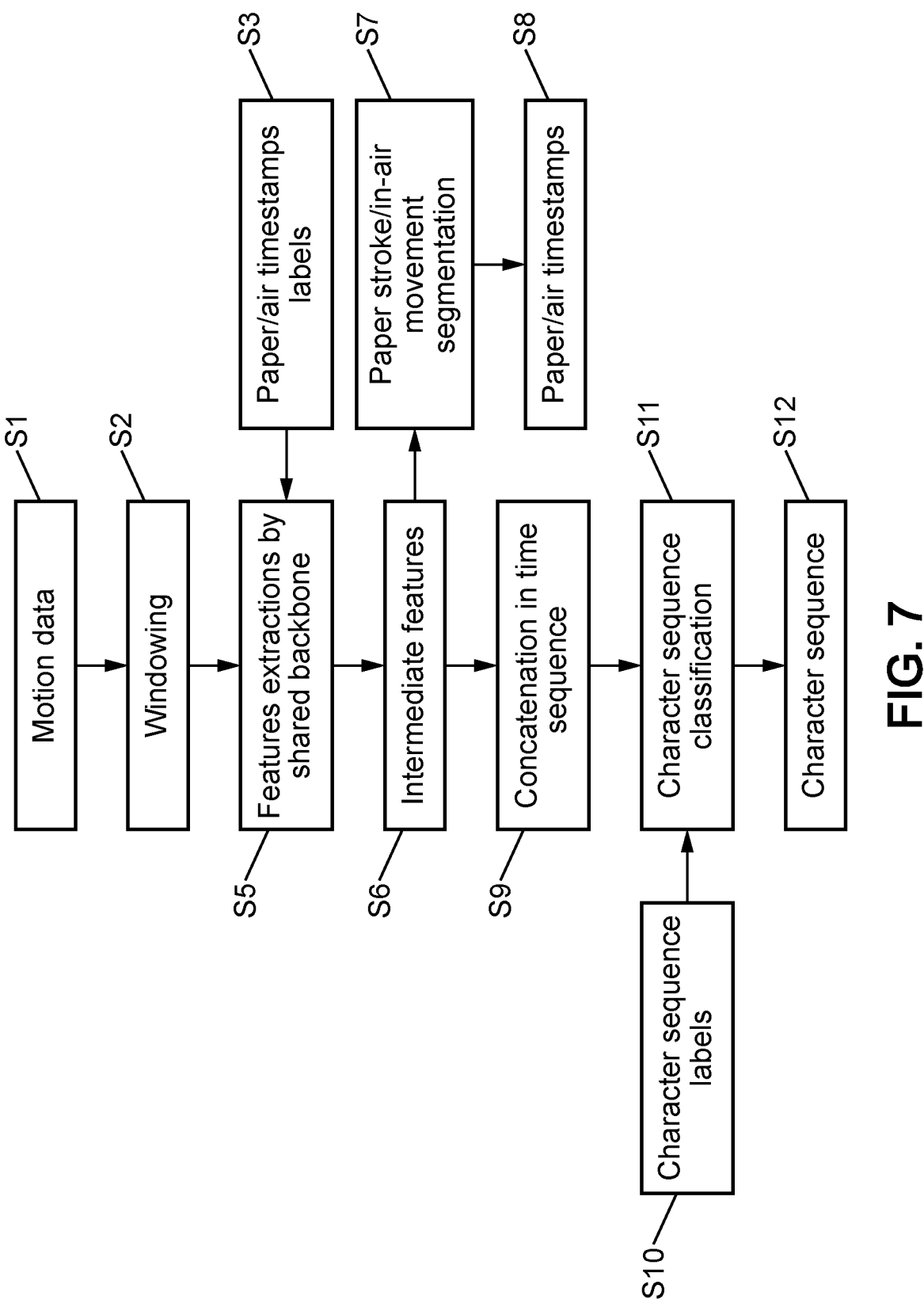
FIG. 7 shows a block diagram illustrating the multi-task training phase of the machine learning model according to an embodiment.

Reference is made to FIG. 7, illustrating steps of the training phases of the multi-task machine learning model.

In step S1, the calculating unit 8 receives the motion data acquired by at least one motion sensor 7 while the user is writing a character, or a sequence of characters with the handwriting instrument 2.

A step S2 of pre-processing is performed. The pre-processing step comprises the time windowing of the motion data such that the motion data is cut into time-steps.

In examples, the motion data is windowed into time-steps of a size comprised between 1 and 5 seconds.

The windowed motion data, i.e. the time-steps, are then fed in the shared backbone. The shared backbone further receives labels at step S3.

In embodiments, the labels correspond to on-paper and in-air time stamped labels. In other words, the labels correspond to whether the writing tip 6 of the handwriting instrument 2 touched the paper, which corresponds to the on-paper label, or not, which corresponds to the in-air label. The labels are time stamped and relative to each data sample.

Typically, when using a motion sensor 7 such as a three-axis accelerometer (or a three-axis accelerometer and a three-axis gyroscope), the motion data acquired by the motion sensor 7 is continuous and lacks positional information. More particularly, the motion data comprises both motion data corresponding to when the user is writing with it on a support and motion data corresponding to when the user is just moving the handwriting instrument 2 in the air, without writing.

At step S5, the shared backbone performs hidden features extraction to obtain intermediate features at step S6.

From these intermediate features, the segmentation task, or second task, is performed at step S7. This step allows finding the starting and ending time of each stroke. During this step, the segmentation task comprises the segmentation of the on-paper strokes and in-air movements.

At step S8, the on-paper strokes and in-air movements classes are obtained for each time sample in the signals.

The intermediate features of step S6 are also used in step S9. In step S9, the machine learning model performs the concatenation in time sequence of the on-paper strokes and in-air movements.

At step S10, other labels are sent to the machine learning model for performing the first task of sequence of characters recognition.

More specifically, these labels may be fed into the recursive neural network participating in the first task.

These labels may correspond to character labels or character sequence labels that are used in the character sequence classification step S11.

The labels may be individual characters, words, or even sentences.

The classification step S11 may be performed at least in part by the recursive neural network, such as a BLSTM or a Transformer, trained with a loss function such as the CTC loss function, as described above.

Finally, a characters sequence is obtained at step S12, which corresponds to the characters sequence written by the user while using the handwriting instrument 2, and to which the motion data was associated at step S1.

During the training of the machine learning model, the machine learning model learns to recognize both on-paper strokes and in-air movements from the motion data in addition to continuously recognize characters sequence.

The multi-task training of the machine learning model renders the system more efficient. Indeed, the learning of the second task and the first task, at the same time, makes the learning of the first task significantly more efficient.

Moreover, since the machine learning model acquires the knowledge to identify individual on-paper strokes and in-air movements from the motion data, it is able to learn any character of any language.

Steps S1 to S6 and S9 to S12 may be assimilated to the first task of characters sequence recognition.

Steps S1 to S8 may be assimilated to the second task of stroke segmentation.

Once the multi-task training is performed, the machine learning model can be stored in the calculating unit 8.

In embodiments, only the weights of the first task are used during the inference phase, such that the machine learning model stored in the calculating unit only comprises the weights of the first task.

In embodiments, the machine learning model is further trained to differentiate forward in-air movement and backward in-air movement. Indeed, paper strokes are not always ordered such that it cannot be assumed that the most recent stroke belongs to the most recent character, as people can go back to finish a previous character.

Figure 9A:
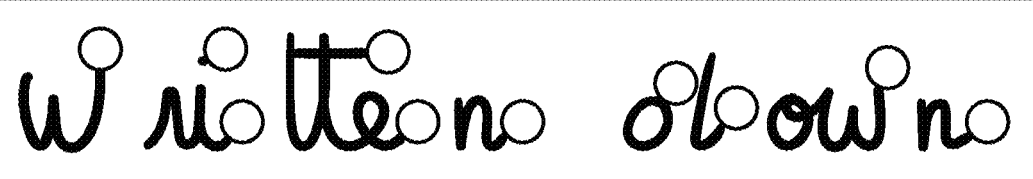
FIGS. 9A and 9B show a characters sequence written by a user using the handwriting instrument and the associated motion data.
Figure 9B:
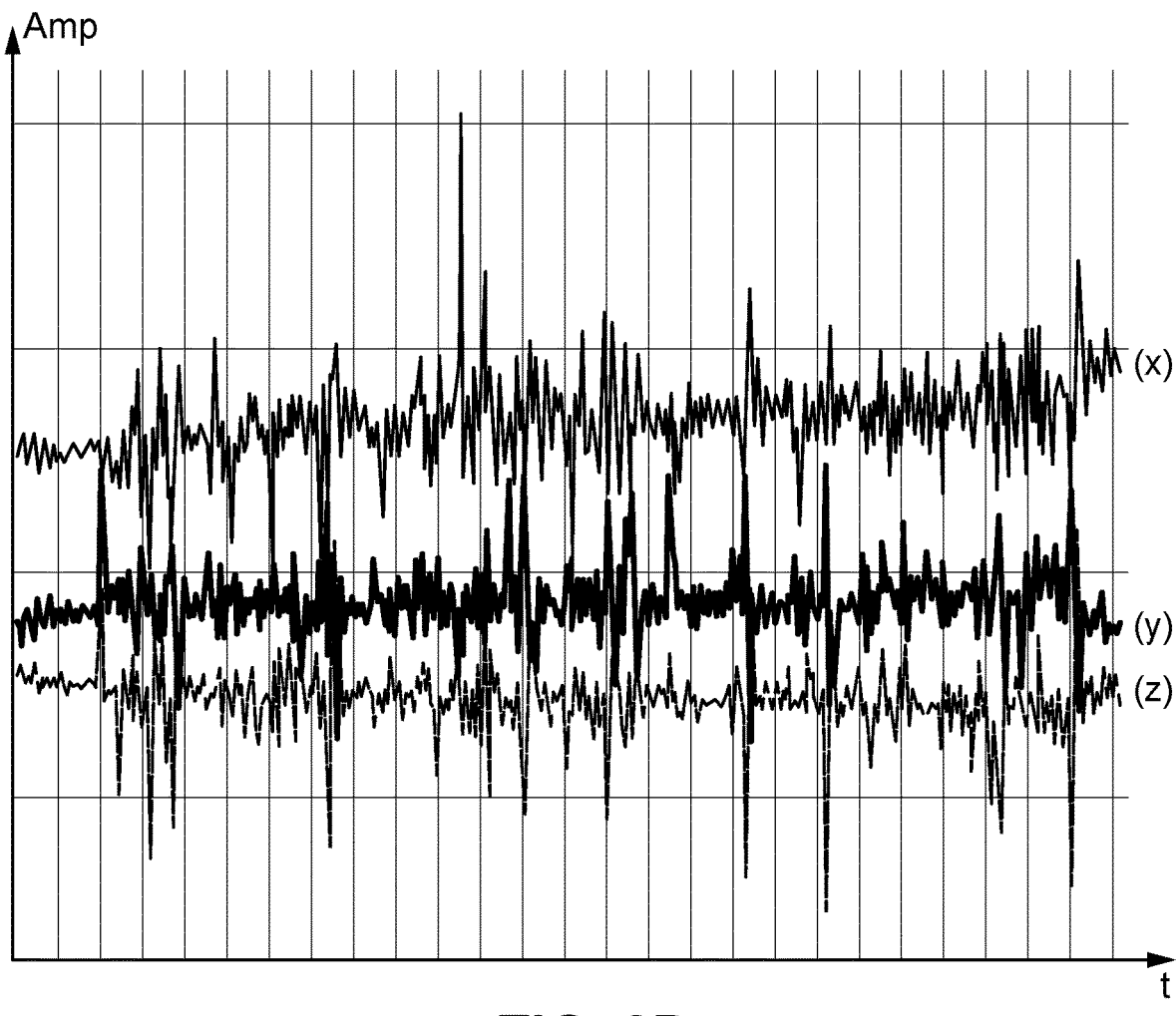

This is illustrated on FIGS. 9A and 9B showing the characters sequence "written down" being written on paper and the associated motion data.

In this example the motion data corresponds to the acceleration signal acquired by a three-axis accelerometer. The graphic of FIG. 9B shows the amplitude of the acceleration signal according to the tree-axis x, y, z as a function of time.

The characters sequence of FIG. 9A comprises ten paper strokes, six forward jumps between letters, one forward jump between words and two backward jumps (before the "i" point and before the "t" bar).

The circles are associated with each of the paper stroke.

It then appears that it may be important to consider also the direction of the in-air movements.

In particular, the detection of forward in-air movement may help the machine learning model to recognize the space between characters or words. The detection of backward in-air movement may help the machine learning model to recognize that a character is being finished (for example with the points on the i).

Then, in step S3 of FIG. 7, the labels may include on-paper time label, forward in-air movement and backward in-air movement, such that in step S7 the segmentation task is made to obtain on-paper stroke, forward in-air movement and backward in-air movement.

In embodiments, the machine learning model may be further trained with another label. This label may be other in-air movement.

This label can help the machine learning model to determine that a user is not writing anymore. For example, it detects that the user is thinking or simply wagging the handwriting instrument 2 in the air.

The trained machine learning model can then be stored in the calculating unit 8.

Figure 8:
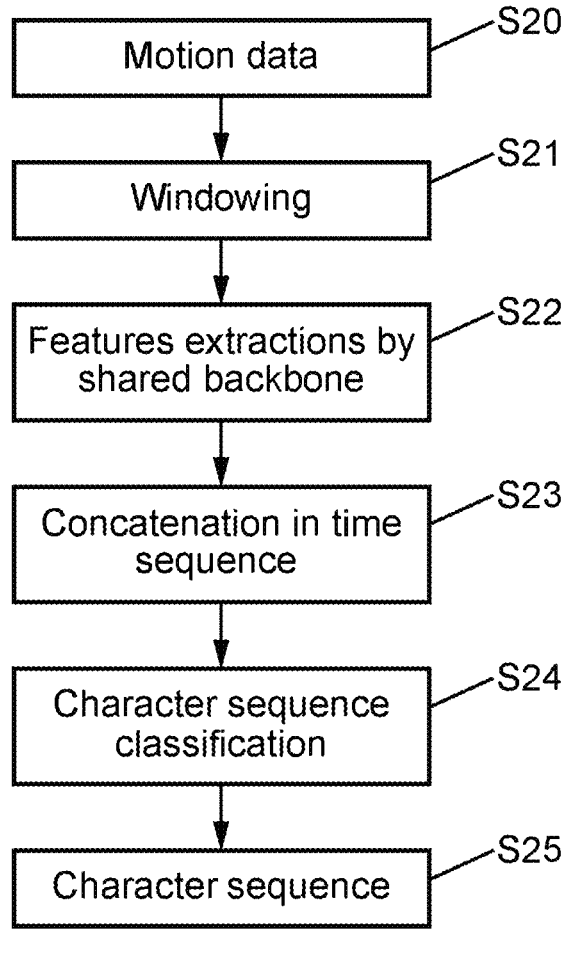
FIG. 8 shows a block diagram illustrating the inference phase of the machine learning model after its multi-task training according to an embodiment.

FIG. 8 illustrates the inference phase of the machine learning model.

At step S20, the motion data is obtained from at least one motion sensor 7.

In examples, the motion data corresponds to the raw signals acquired by at least one motion sensor 7 while the user is writing a sequence of characters with the handwriting instrument 2.

The motion data are then pre-processed by windowing these motion data into time steps at step S21. This step corresponds to step S2 described in reference with FIG. 7.

The windowed motion data are then fed, at step S22, in the shared backbone which performs the features extraction such as described with reference to step S5 of FIG. 7.

From these features extraction, the machine learning model performs the concatenation in time sequence, at step S23, such that the character sequence classification performed at step S24 is made on the on-paper strokes and in-air movement in the correct chronological order.

As already described, the in-air movement may comprise forward in-air movement and backward in-air movement.

At step S25, a character sequence is obtained as an output of the machine learning model, which corresponds to the character sequence written by the user with the handwriting instrument.

In examples, during the inference phase, the machine learning model does not perform the segmentation task anymore since the shared backbone has already been trained with the weights corresponding to both the segmentation and the character classification task, due to the multi-task training.

This disclosure is not restricted to the embodiments described herein above. Other variants may be implemented.

In embodiments, the machine learning model performs, after the segmentation task (step S7 of FIG. 7), a stroke acceleration regression and or/or in-air movement acceleration regression tasks. This enables the machine learning model to derive the coordinates of the writing tip, based on the motion data. In this way, the machine learning model may deliver as an output a replica of the sequence of characters written by the user, including the shape of the characters.

The invention claimed is:

1. A system for recognizing an online handwriting of a user comprising:

a handwriting instrument including a body extending longitudinally between a first end and a second end, the first end having a writing tip which is able to write on a support, a module comprising at least one motion sensor configured to acquire motion data on the online handwriting of the user when the user is writing a characters sequence with the handwriting instrument, a calculating unit comprising a memory and a processor, the calculating unit communicating with the at least one motion sensor and configured to analyze the motion data by a machine learning model trained in a multitask way such that it is capable of performing a stroke segmentation task and a character classification task at a same time, wherein:

the machine learning model comprises a shared backbone neural network configured to perform hidden features extraction of the motion data to obtain intermediate features, the stroke segmentation task is performed on the intermediate features, and the character classification task is performed using a recursive neural network using the intermediate features, and the machine learning model being configured to deliver as an output the characters sequence which was written by the user with the handwriting instrument.

2. The system according to claim 1, wherein the module is embedded in the second end of the handwriting instrument.

3. The system according to claim 1, wherein the module is placed on an outside surface of the second end of the handwriting instrument.

4. The system according to claim 1, wherein the module further comprises the calculating unit.

5. The system according to claim 1, wherein the module further includes a short-range radio communication interface configured to communicate raw motion data acquired by the at least one motion sensor to a mobile device comprising the calculating unit via a communication interface of the mobile device.

6. The system according to claim 1, wherein the at least one motion sensor is a three-axis accelerometer.

7. The system according to claim 6, wherein the module further comprises a second motion sensor being a three-axis gyroscope.

8. The system according to claim 1, wherein characters of the characters sequence comprise numbers.

9. The system according to claim 1, wherein the calculating unit comprises a volatile memory to store the motion data acquired by the at least one motion sensor.

10. The system according to claim 1, wherein the calculating unit comprises a non-volatile memory to store the machine learning model enabling the recognizing of the online handwriting of the user.

11. The system according to claim 1, wherein the trained machine learning model is stored in the calculating unit.

12. The system according to claim 1, wherein the stroke segmentation task comprises labeling the acquired motion data in at least one of following classes: on-paper stroke or in-air movement.

13. The system according to claim 12, wherein the trained machine learning model is further configured such that the acquired motion data is pre-processed before being used in the stroke segmentation task, wherein pre-processing comprises windowing raw motion data in time frames of N samples, wherein the samples are labeled in one of the on-paper stroke or the in-air movement.

14. The system according to claim 12, wherein an in-air movement label comprises at least two sub-labels, forward in-air movement and backward in-air movement.

15. The system according to claim 1, wherein the module further includes a battery configured to provide power to the at least one motion sensor when the user is using the handwriting instrument.

16. The system according to claim 15, wherein the battery is further configured to provide power to other components comprised in the module.

17. The system according to claim 1, wherein characters of the characters sequence comprise letters.

\* \* \* \* \*